United States Patent
Ogawa et al.

(10) Patent No.: US 9,969,012 B2
(45) Date of Patent: May 15, 2018

(54) DRILL AND METHOD FOR MANUFACTURING CUT PRODUCT USING SAME

(71) Applicant: KYOCERA Corporation, Kyoto-shi, Kyoto (JP)

(72) Inventors: Hiroshi Ogawa, Omihachiman (JP); Satoshi Tetsukawa, Omihachiman (JP)

(73) Assignee: KYOCERA CORPORATION, Kyoto-Shi, Kyoto (JP)

(*) Notice: Subject to any disclaimer, the term of this patent is extended or adjusted under 35 U.S.C. 154(b) by 139 days.

(21) Appl. No.: 14/913,184

(22) PCT Filed: Aug. 26, 2014

(86) PCT No.: PCT/JP2014/072223
§ 371 (c)(1),
(2) Date: Feb. 19, 2016

(87) PCT Pub. No.: WO2015/029963
PCT Pub. Date: Mar. 5, 2015

(65) Prior Publication Data
US 2016/0207120 A1    Jul. 21, 2016

(30) Foreign Application Priority Data
Aug. 26, 2013  (JP) .................. 2013-174804

(51) Int. Cl.
B23B 51/02        (2006.01)
(52) U.S. Cl.
CPC ........ *B23B 51/02* (2013.01); *B23B 2251/046* (2013.01); *B23B 2251/404* (2013.01); *B23B 2251/406* (2013.01); *Y10T 408/9097* (2015.01)
(58) Field of Classification Search
CPC .............. B23B 51/02; B23B 2251/404; B23B 2251/406; Y10T 408/9097
See application file for complete search history.

(56) References Cited

U.S. PATENT DOCUMENTS

| 308,707 | A | * | 12/1884 | Shirk | .................... | B23B 51/02 |
| | | | | | | 131/246 |
| 2,912,887 | A | * | 11/1959 | Andreasson | ............ | B23B 51/06 |
| | | | | | | 408/230 |

(Continued)

FOREIGN PATENT DOCUMENTS

| DE | 102007062539 A1 | * | 6/2008 | ............. | B23B 51/02 |
| DE | 102014109344 A1 | * | 3/2015 | ............. | B23B 51/02 |

(Continued)

OTHER PUBLICATIONS

International Search Report (Form PCT/ISA/210) dated Nov. 25, 2014, issued for International Patent Application No. PCT/JP2014/072223.

*Primary Examiner* — Eric A Gates
(74) *Attorney, Agent, or Firm* — Volpe and Koenig, P.C.

(57) ABSTRACT

A drill (1) based on an embodiment of the present invention is equipped with: a first chip discharge flute that is provided on an outer periphery of a drill body and spirally extends around a rotational axis from a first cutting edge toward a rear end of the drill body; a second chip discharge flute that is provided on the outer periphery of the drill body and spirally extends around the rotational axis from a second cutting edge toward the rear end of the drill body; and an auxiliary flute that is provided on the outer periphery of the drill body and extends along the second chip discharge flute on a front side in a rotating direction of the rotational axis, wherein a rear end of the second chip discharge flute extends further toward the rear end of the drill body than the first chip discharge flute.

11 Claims, 25 Drawing Sheets

(56) References Cited

U.S. PATENT DOCUMENTS

| | | | |
|---|---|---|---|
| 3,045,513 A * | 7/1962 | Andreasson | B23B 51/06 408/230 |
| 5,174,691 A * | 12/1992 | Shepley | B23B 51/02 408/1 R |
| 5,897,274 A * | 4/1999 | Ogura | B23B 31/005 408/229 |
| 9,421,620 B2 * | 8/2016 | Guo | B23B 51/02 |
| 2013/0170920 A1 * | 7/2013 | Ogawa | B23B 51/02 408/1 R |

FOREIGN PATENT DOCUMENTS

| | | | | |
|---|---|---|---|---|
| JP | 2007-307642 A | | 11/2007 | |
| JP | 2008238354 A | * | 10/2008 | |
| JP | 2010162643 A | * | 7/2010 | |
| JP | 2012-110984 A | | 6/2012 | |
| WO | WO 2010143595 A1 | * | 12/2010 | ............ B23B 51/00 |
| WO | WO 2013065695 A1 | * | 5/2013 | ............ B23B 51/02 |

* cited by examiner

DRILL AND METHOD FOR MANUFACTURING CUT PRODUCT USING SAME

TECHNICAL FIELD

The present invention relates to a drill used in cut processing, and a method for manufacturing a cut product.

BACKGROUND ART

As drills used in cut processing of a work material such as a metal member, there have been conventionally known the drills disclosed in Japanese Unexamined Patent Application Publication No. 2007-307642A (Patent Document 1) and Japanese Unexamined Patent Application Publication No. 2012-110984A (Patent Document 2). The drills disclosed in Patent Documents 1 and 2 include a body, two cutting edges formed at a tip end of the body, and two twisted flutes for discharging chips generated by the cutting edges. The two flutes have helix angles that differ from each other. The difference between the helix angle of one flute and the helix angle of the other flute causes the two flutes to join at a position receded by a predetermined amount from the tip end of the body, forming one flute rearward from a joining point. The joining of the two flutes makes it possible to increase a rigidity on a rear portion side of the body while performing machining with a favorable cutting balance.

In the drills disclosed in Patent Documents 1 and 2, the direction in which the chips flow changes at a location where the two flutes join. Nevertheless, because the two flutes directly join, a space through which the chips flow at the location where the flutes join is not sufficiently wide, resulting in the possibility of chip flow stagnation and clogged by chips.

The present invention has been made in view of the above problems, and it is an object of the present invention to provide a drill capable of favorably discharging chips even if the drill includes a plurality of joining flutes.

SUMMARY OF INVENTION

A drill based on an aspect of the present invention includes: a rod-shaped drill body configured to rotate about a rotational axis; a first cutting edge and a second cutting edge positioned on a tip end portion of the drill body; a first chip discharge flute that is provided on an outer periphery of the drill body and spirally extends around the rotational axis from the first cutting edge toward a rear end portion of the drill body; a second chip discharge flute that is provided on the outer periphery of the drill body and spirally extends around the rotational axis from the second cutting edge toward the rear end portion of the drill body; and an auxiliary flute that is provided on the outer periphery of the drill body and extends along the second chip discharge flute on a front side in a rotating direction of the rotational axis. A rear end of the second chip discharge flute extends further toward the rear end portion of the drill body than a rear end of the first chip discharge flute, and the rear end of the first chip discharge flute joins with the auxiliary flute.

DESCRIPTION OF EMBODIMENTS

Drill

Figure 1:
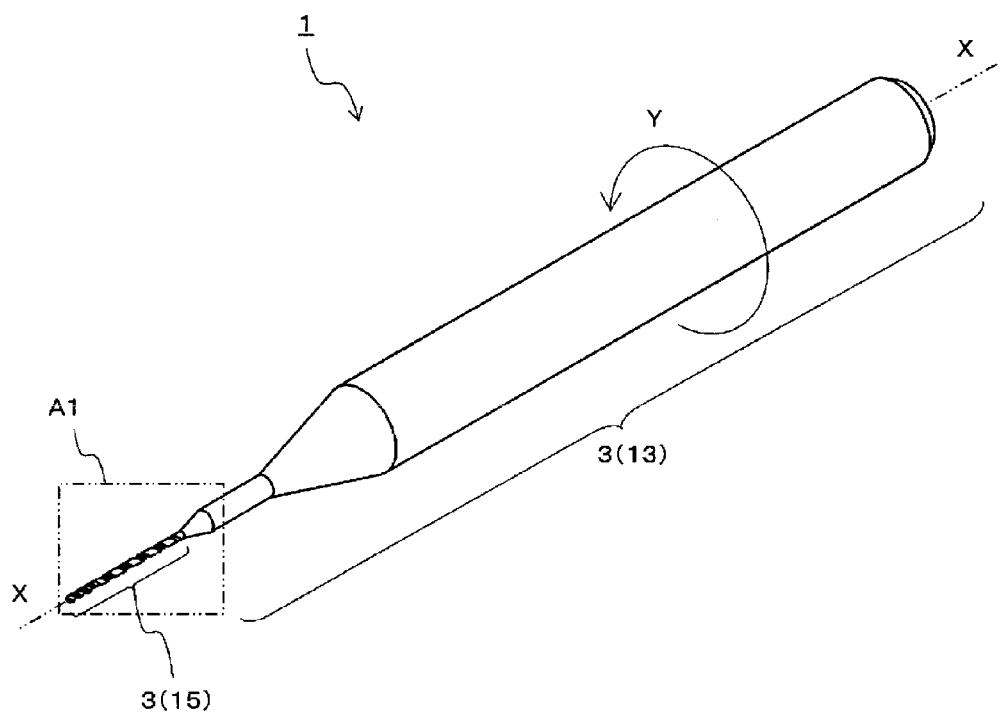
FIG. 1 is a perspective view illustrating a drill of one embodiment of the present invention.

The following describes in detail a drill 1 of one embodiment of the present invention using the drawings. It should be noted that, for ease of explanation, each of the drawings referenced below are simplified drawings illustrating only the main parts among the constituent members of the embodiment required for describing the present invention. Thus, the drill of the present invention may be provided with any constituent members not illustrated in the referenced drawings. Further, the dimensions of the members in the drawings do not faithfully represent the actual dimensions of the constituent members, the dimension ratios of the members, or the like.

Figure 2:
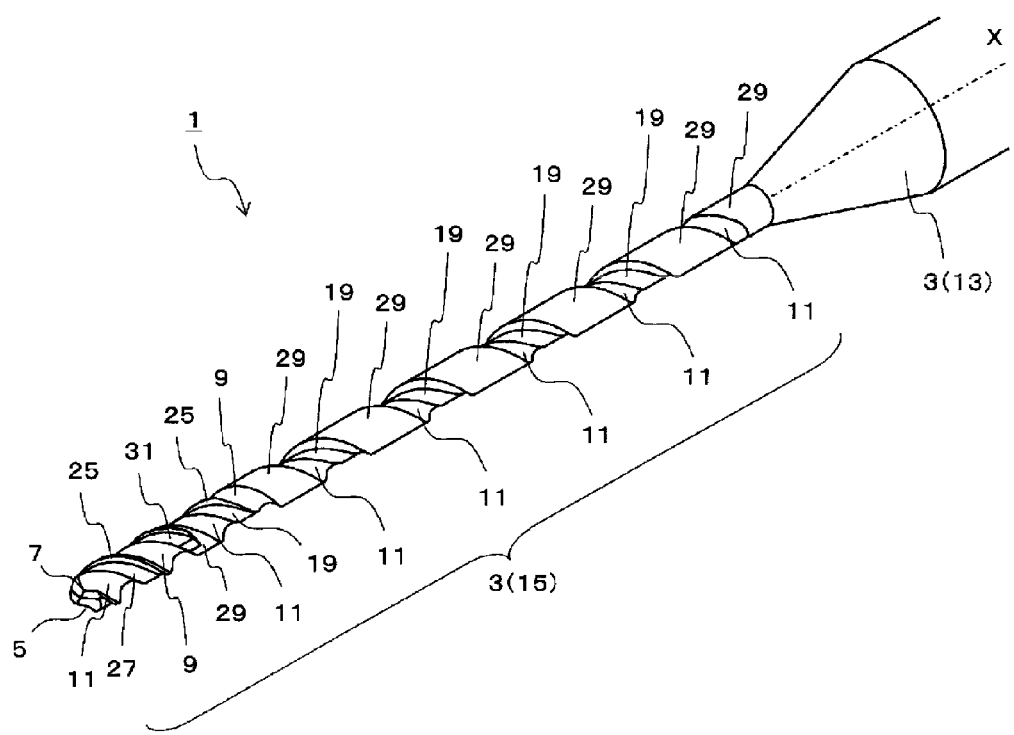
FIG. 2 is an enlarged perspective view of the region A1 of the drill illustrated in FIG. 1.

The drill 1 of the present embodiment, as illustrated in FIG. 2, includes a drill body 3, a first cutting edge 5, a second cutting edge 7, a first chip discharge flute 9, and a second chip discharge flute 11.

The drill body 3, as illustrated in FIG. 1, has a rotational axis X, and a rod-shaped configuration that extends along this rotational axis X. The drill body 3 rotates about the rotational axis X when used. The drill body 3 of the present embodiment includes a gripped portion 13 gripped by a spindle or the like rotated by a machine tool (not illustrated), and a cutting portion 15 positioned on a tip end side of this gripped portion 13. The gripped portion 13 is an area designed in accordance with a shape of the spindle of the machine tool, and is generally called a shank. The cutting portion 15 is an area that comes into contact with a work material, plays a key role in cut processing of the work material, and is generally called a body. It should be noted that the direction Y in FIG. 1 indicates the rotating direction of the drill body 3.

Examples of the material of the drill body 3 include a cemented carbide alloy that contains tungsten carbide (WC) and cobalt (Co) as a binder, an alloy that includes this cemented carbide alloy and an additive such as titanium carbide (TiC) or tantalum carbide (TaC) added thereto, or a metal such as stainless steel and titanium.

An outer diameter D of the cutting portion 15 in the present embodiment can be configured to be from 0.05 mm to 40 mm. Further, a length in a direction along the rotational axis X of the cutting portion 15 can be configured to be about from 3 to 25 D.

The first cutting edge 5 and the second cutting edge 7, as illustrated in FIG. 2, are positioned at a tip end portion of the drill body 3, that is, a tip end portion of the cutting portion 15. The tip end portion of the drill body 3 is an area that comes into contact with the work material and cuts the work material by the first cutting edge 5 and the second cutting edge 7. The tip end portion of the drill body 3 is formed into a conical shape having a width in a direction orthogonal to the rotational axis X that becomes smaller toward the tip end side of the drill 1.

Figure 3:
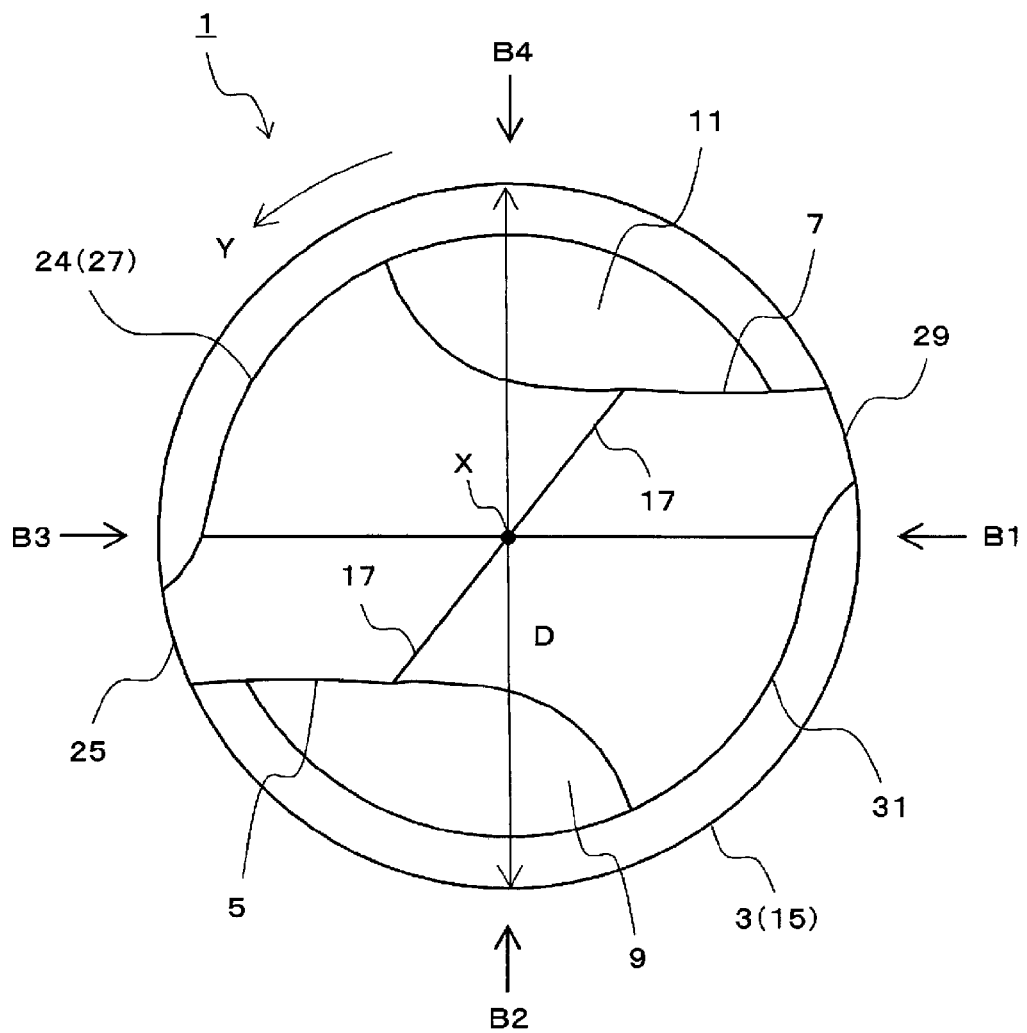
FIG. 3 is a front view from a tip end direction of the drill illustrated in FIG. 2.
Figure 4:
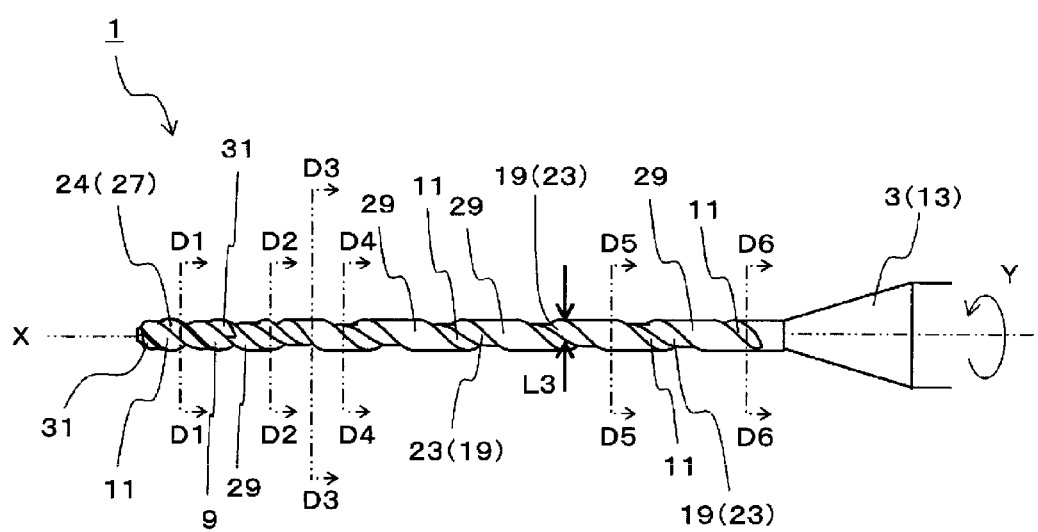
FIG. 4 is a side view from the direction B1 of the drill illustrated in FIG. 3.
Figure 5:
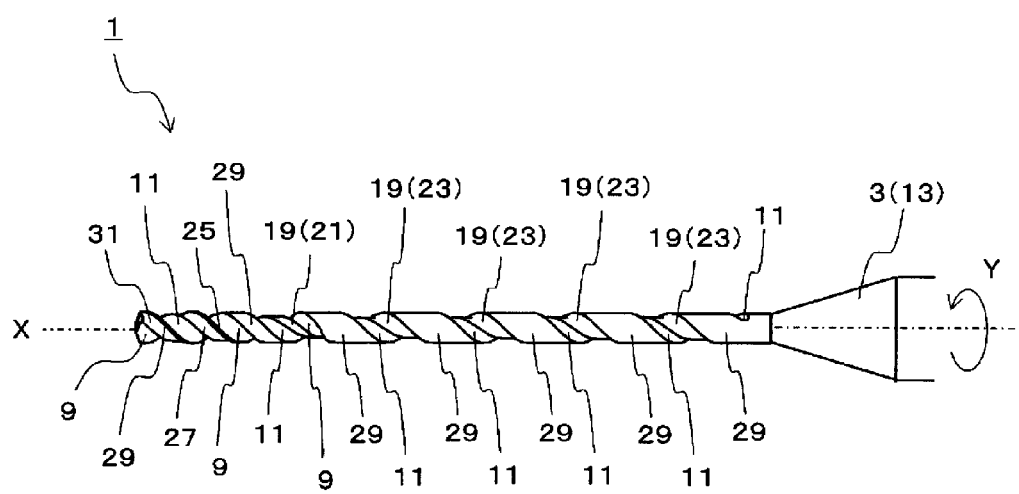
FIG. 5 is a side view from the direction B2 of the drill illustrated in FIG. 3.
Figure 6:
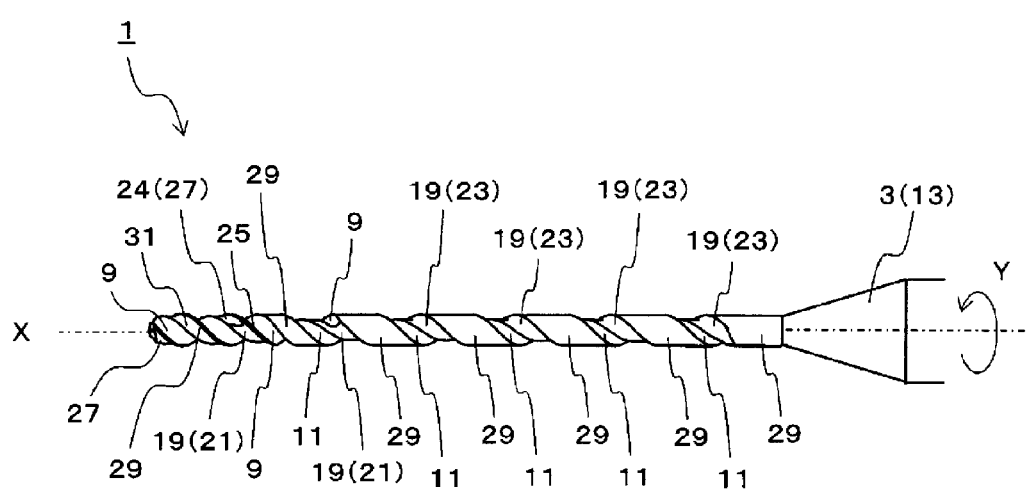
FIG. 6 is a side view from the direction B3 of the drill illustrated in FIG. 3.
Figure 7:
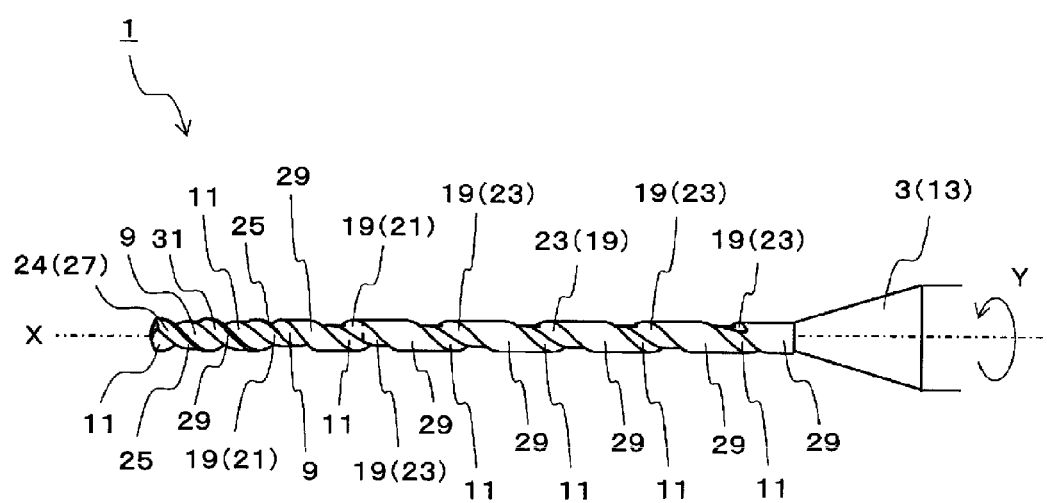
FIG. 7 is a side view from the direction B4 of the drill illustrated in FIG. 3.

The first cutting edge 5 and the second cutting edge 7, as illustrated in FIG. 3, are provided in positions 180° rotationally symmetrical about the rotational axis X when the drill 1 is viewed from the tip end side. The drill 1 of the present embodiment includes a plurality of cutting edges formed by the first cutting edge 5 and the second cutting edge 7, making it possible to achieve a favorable cutting balance compared to when there is one cutting edge.

A chisel edge 17 is positioned on the most tip end portion side of the drill body 3. The first cutting edge 5 and the second cutting edge 7 are separated via the chisel edge 17. The work material is cut by the first cutting edge 5, the second cutting edge 7, and the chisel edge 17. A point angle of the tip end portion having a conical shape is set to about from 100 to 140° when viewed from the side. Further, a chisel angle of the chisel edge 17 is set to about from 130 to 170°.

The first chip discharge flute 9 and the second chip discharge flute 11 are provided on an outer periphery of the drill body 3, as illustrated in FIG. 2. The first chip discharge flute 9 is a flute for discharging the chips of the work material cut by the first cutting edge 5 to the outside. Thus, the first chip discharge flute 9 spirally extends around the rotational axis X from the first cutting edge 5 toward a rear end portion of the drill body 3. In the following, the first chip discharge flute 9 is simply referred to as the first flute 9.

Similarly, the second chip discharge flute 11 is a flute for discharging the chips of the work material cut by the second cutting edge 7 to the outside. Thus, the second chip discharge flute 11 spirally extends around the rotational axis X from the second cutting edge 7 toward the rear end portion of the drill body 3. In the following, the second chip discharge flute 11 is simply referred to as the second flute 11. At this time, to grip the drill body 3 in a stable manner in the machine tool, the first flute 9 and the second flute 11 are formed only in the cutting portion 15 of the drill body 3, and not in the gripped portion 13.

Figure 8:
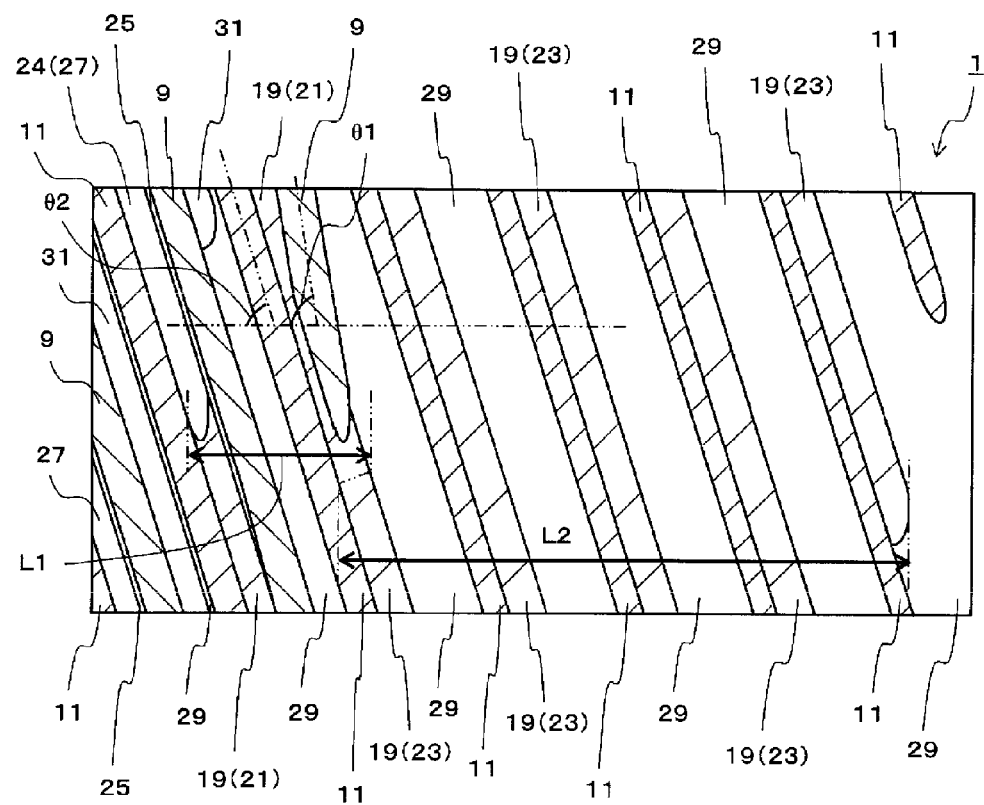
FIG. 8 is a schematic view of the drill illustrated in FIG. 1, with an outer peripheral surface unfolded.
Figure 9:
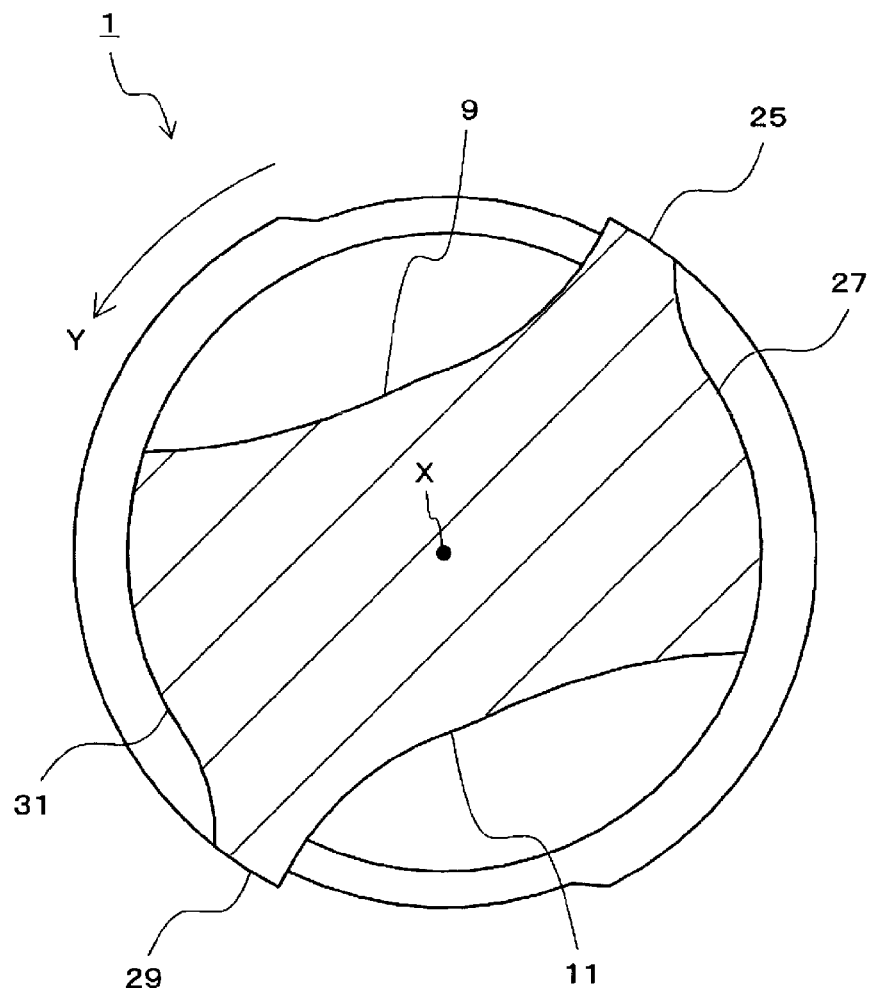
FIG. 9 is a cross-sectional view of the cross section D1 of the drill illustrated in FIG. 4.
Figure 10:
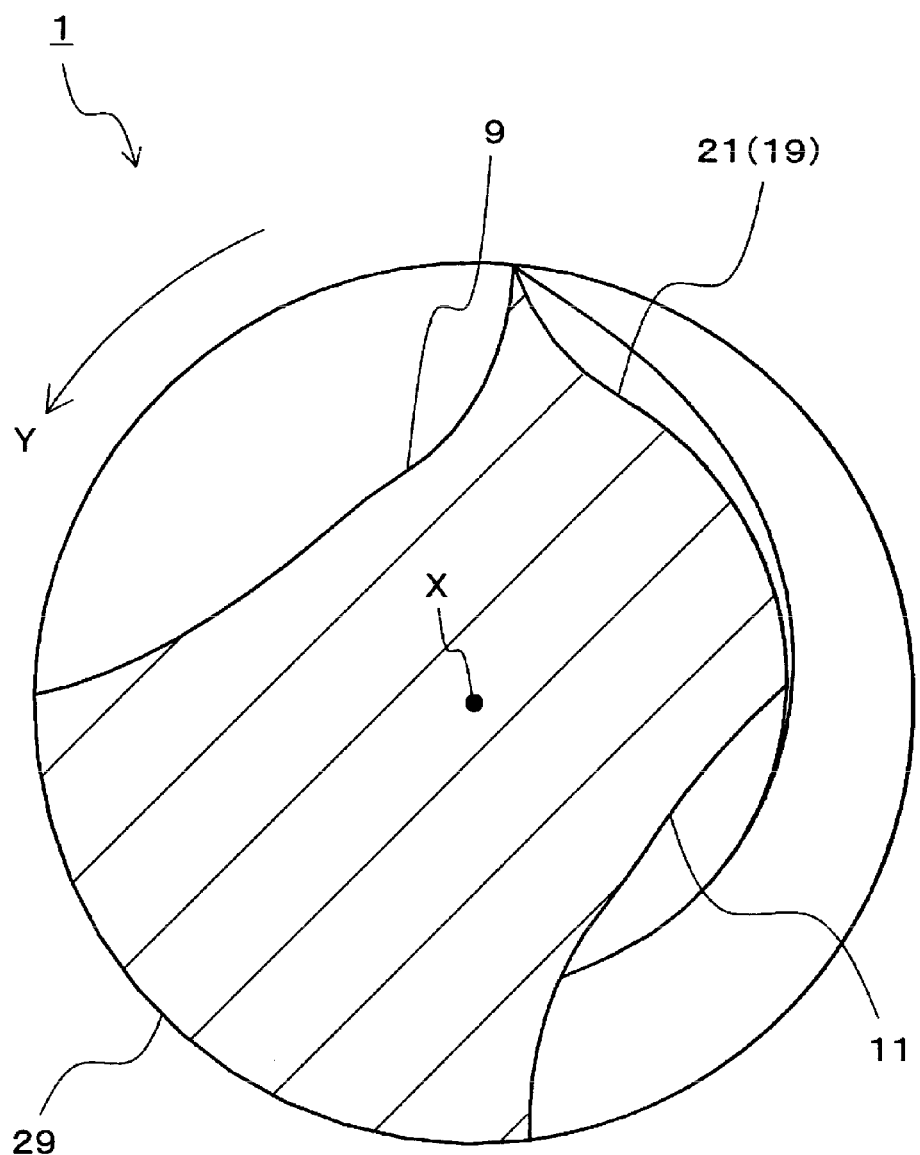
FIG. 10 is a cross-sectional view of the cross section D2 of the drill illustrated in FIG. 4.
Figure 11:
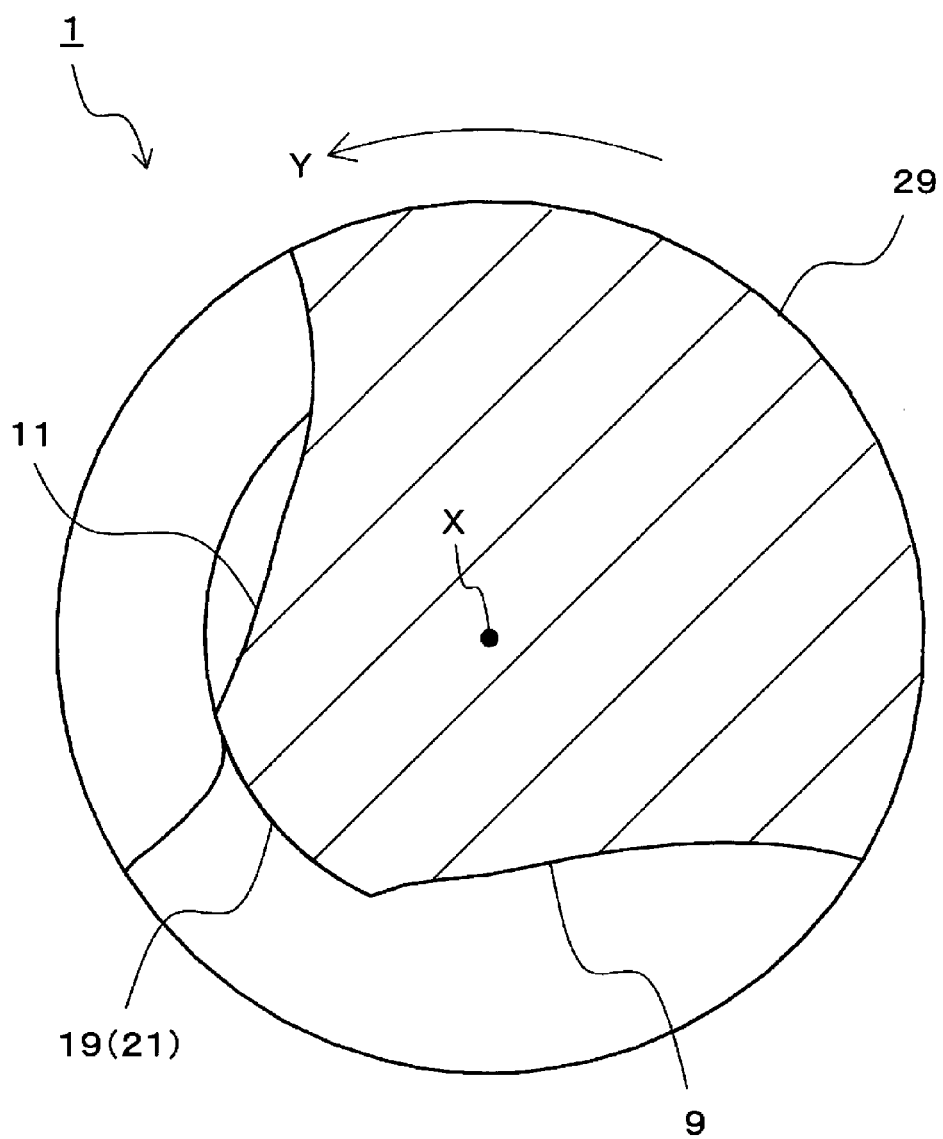
FIG. 11 is a cross-sectional view of the cross section D3 of the drill illustrated in FIG. 4.
Figure 12:
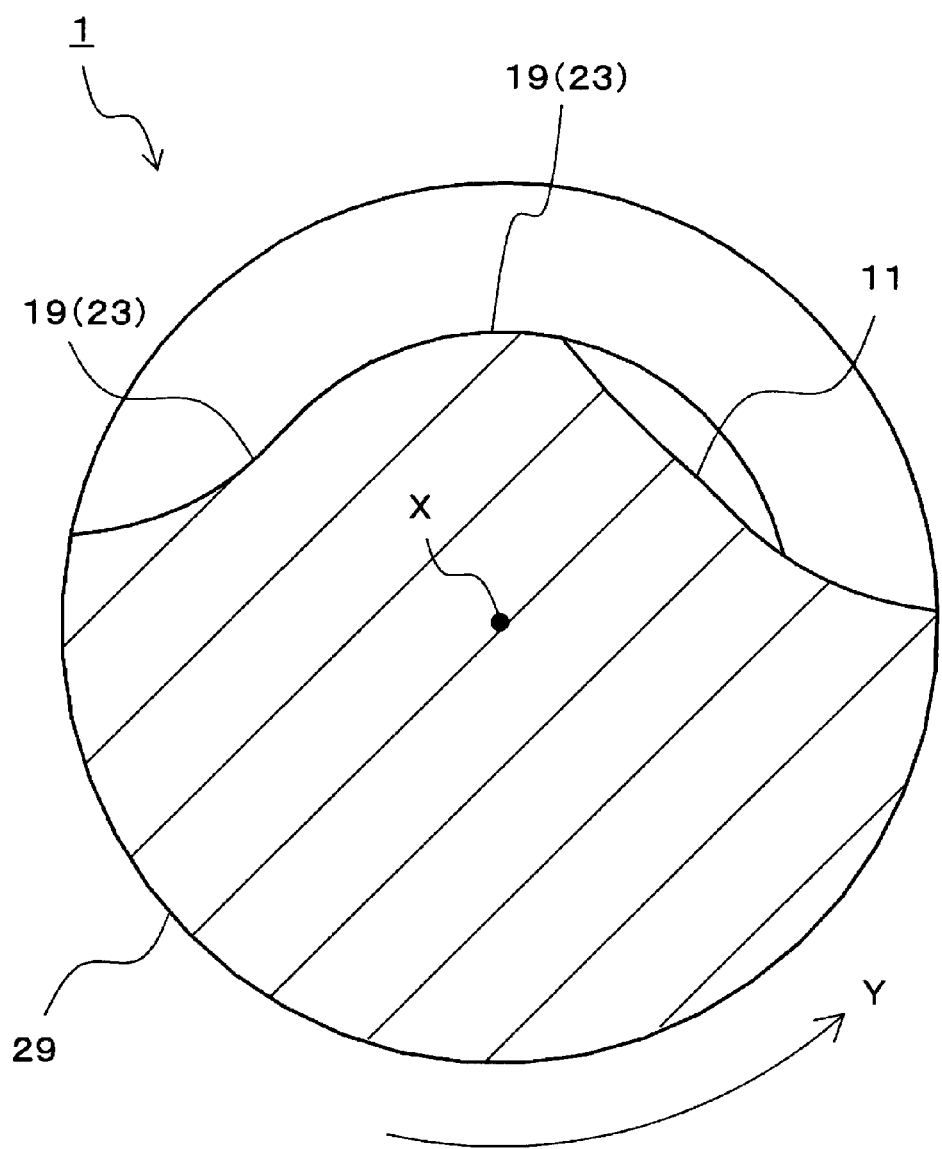
FIG. 12 is a cross-sectional view of the cross section D4 of the drill illustrated in FIG. 4.
Figure 13:
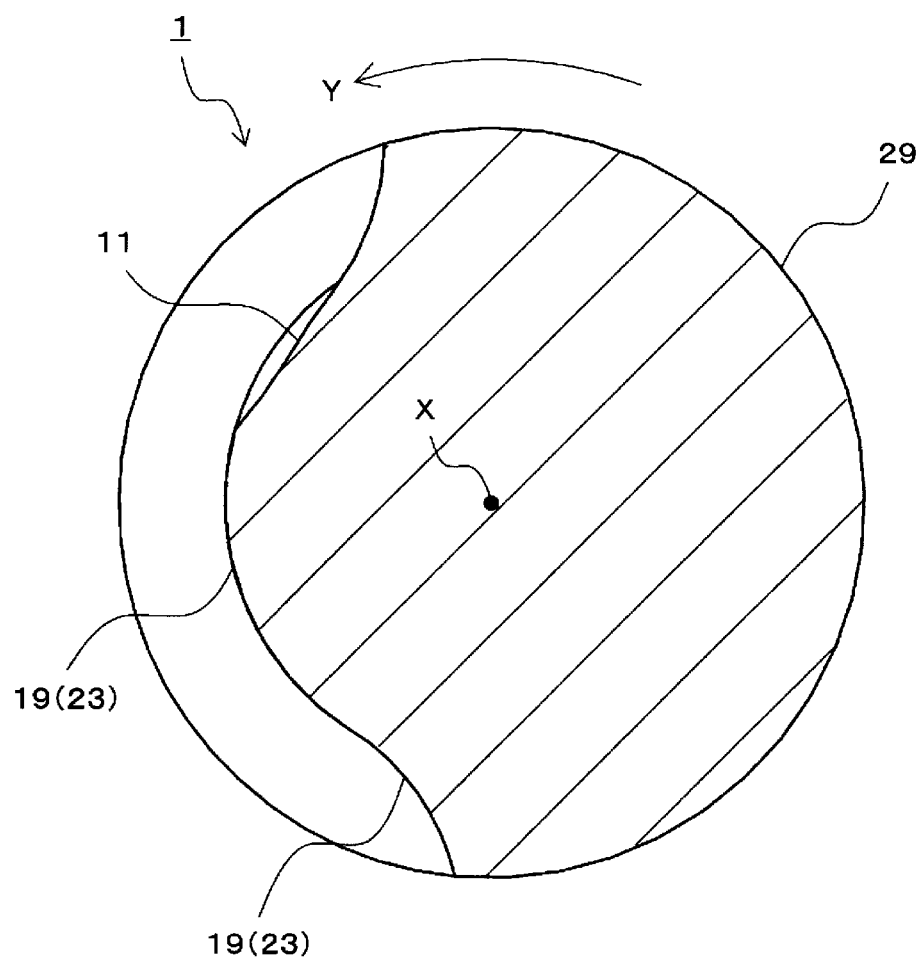
FIG. 13 is a cross-sectional view of the cross section D5 of the drill illustrated in FIG. 4.
Figure 14:
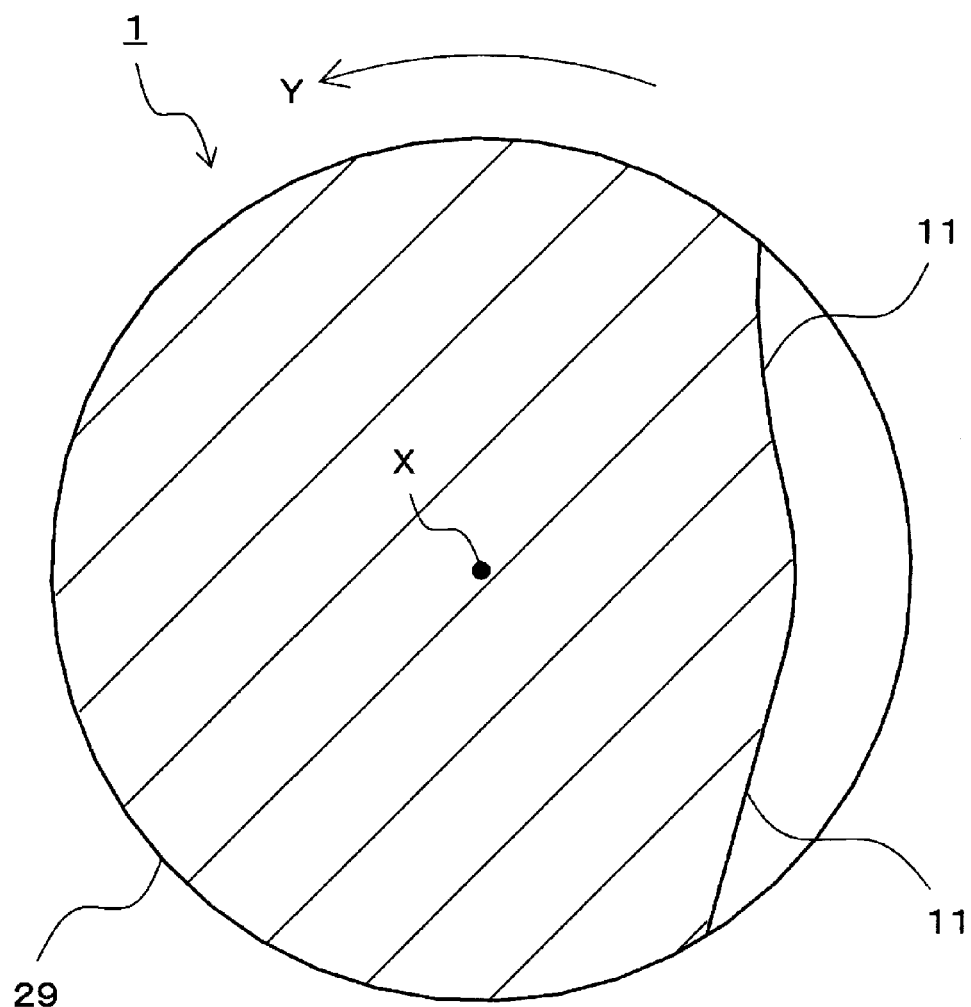
FIG. 14 is a cross-sectional view of the cross section D6 of the drill illustrated in FIG. 4.
Figure 15:
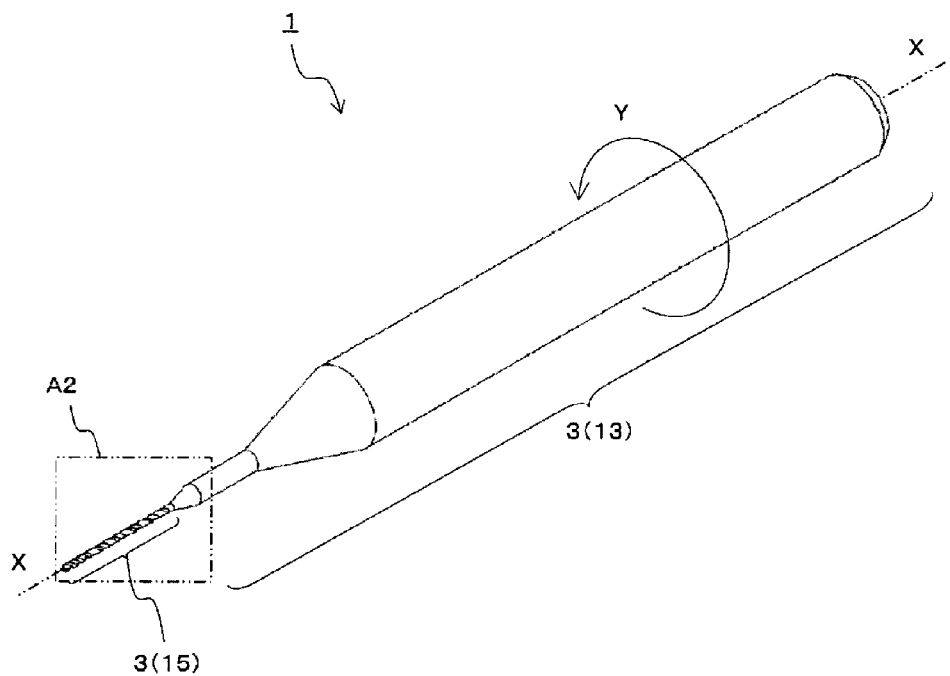
FIG. 15 is a perspective view illustrating a modified example of the drill illustrated in FIG. 1.
Figure 16:
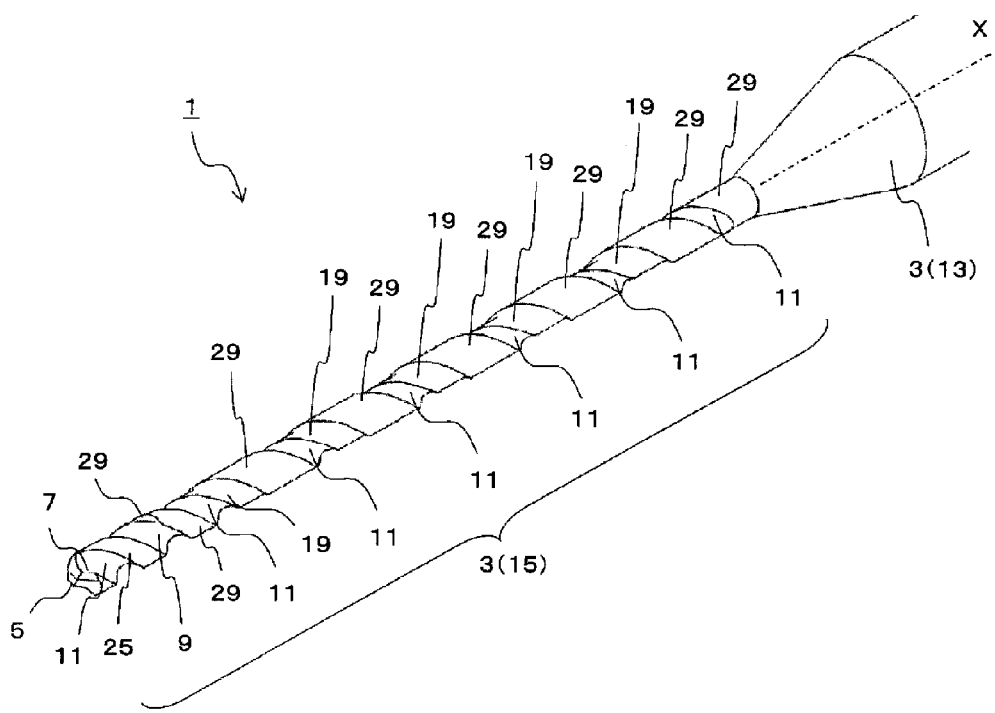
FIG. 16 is an enlarged perspective view of the region A2 of the drill illustrated in FIG. 15.
Figure 17:
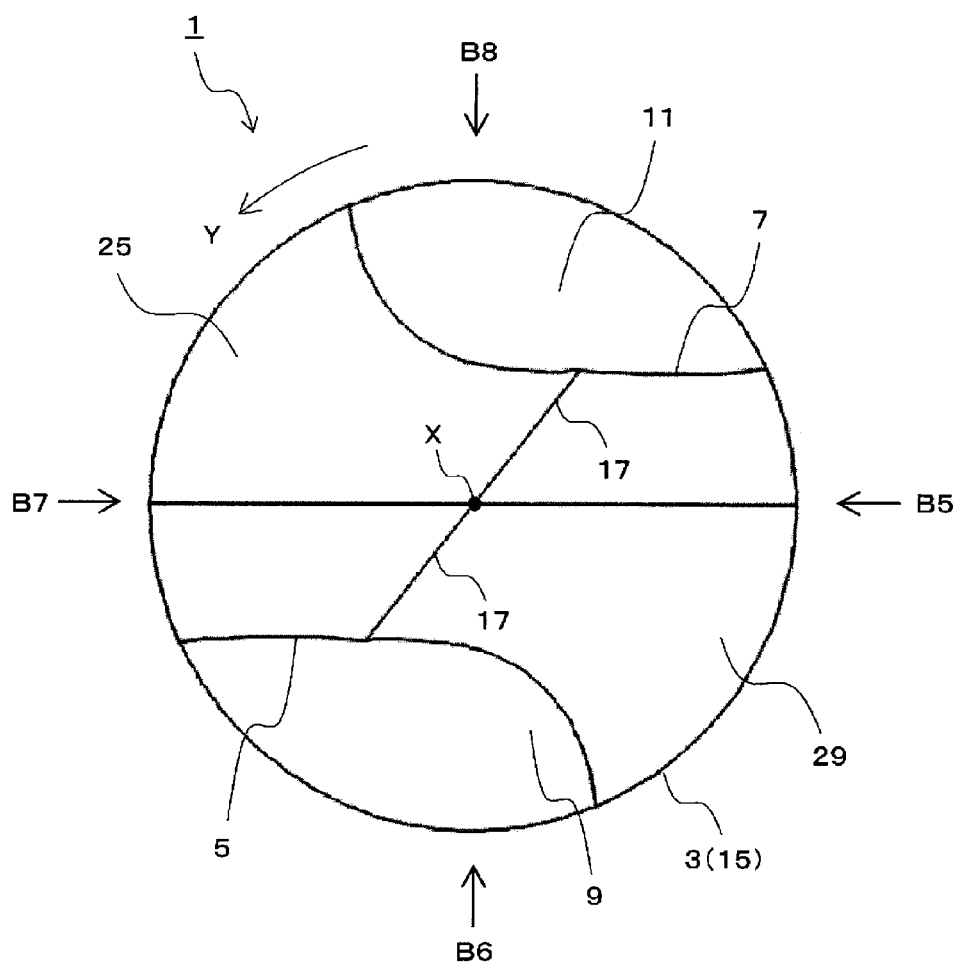
FIG. 17 is a front view from the tip end direction of the drill illustrated in FIG. 16.
Figure 18:
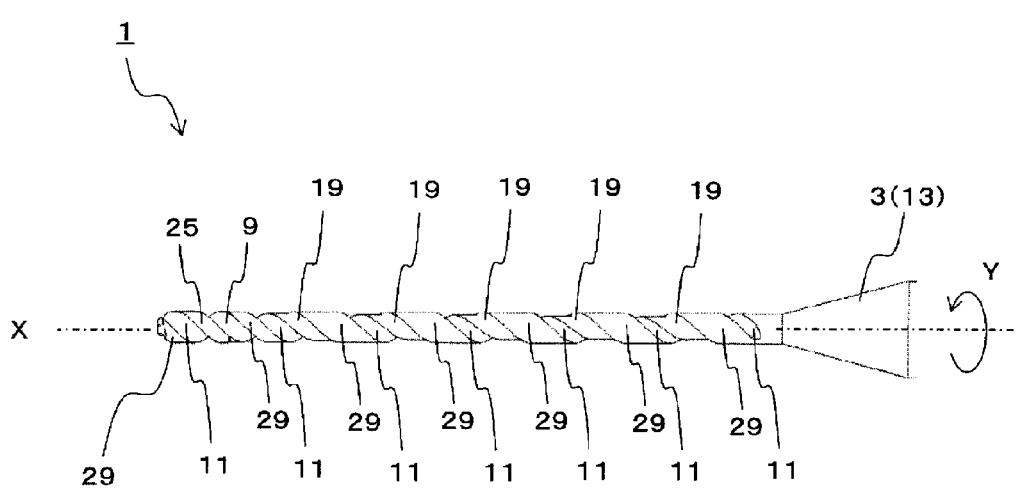
FIG. 18 is a side view from the direction B5 of the drill illustrated in FIG. 17.
Figure 19:
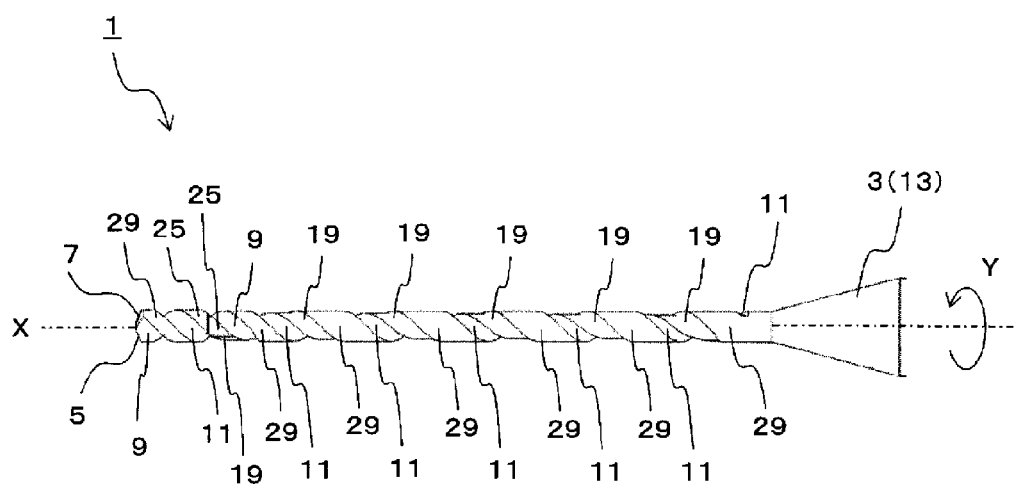
FIG. 19 is a side view from the direction B6 of the drill illustrated in FIG. 17.
Figure 20:
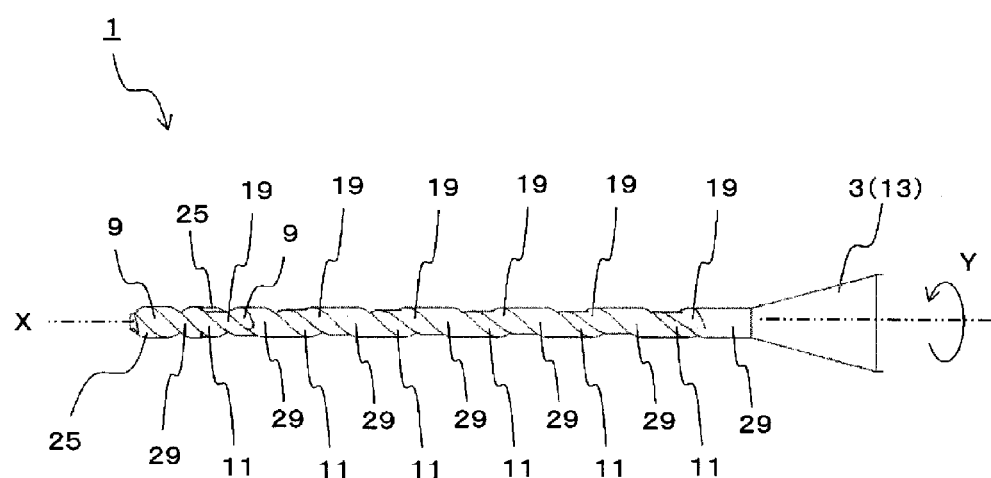
FIG. 20 is a side view from the direction B7 of the drill illustrated in FIG. 17.
Figure 21:
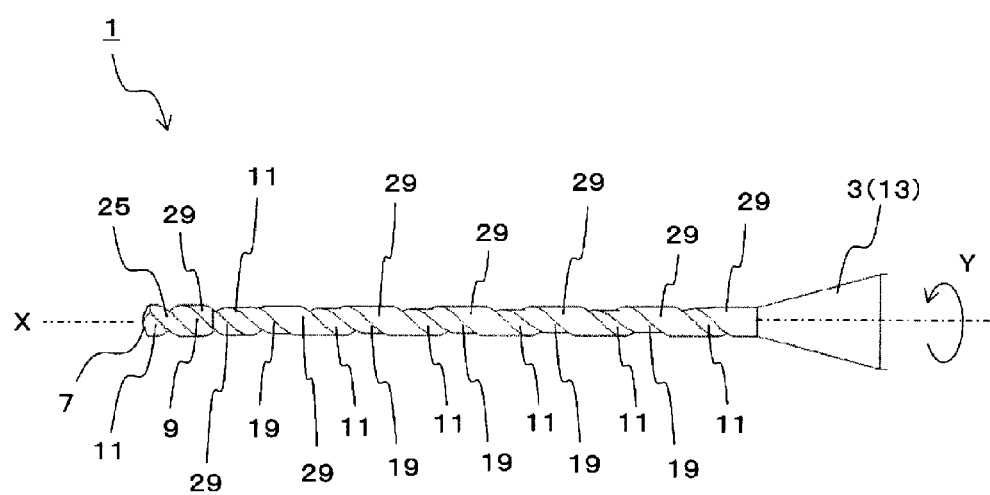
FIG. 21 is a side view from the direction B8 of the drill illustrated in FIG. 17.

In the drill 1 of the present embodiment, a helix angle of the first flute 9 differs from a helix angle of the second flute 11, as illustrated in FIG. 8. Specifically, a helix angle θ1 of the first flute 9 is greater than a helix angle θ2 of the second flute 11. Thus, the first flute 9 comes closer to the second flute 11 toward a side opposite the rotating direction of the drill body 3, and joins with the second flute 11 midway along the drill body 3 extending from the tip end portion toward the rear end portion. Such joining of the first flute 9 with the second flute 11 makes it possible to increase a rigidity of the drill body 3.

Specifically, when a drill includes a plurality of cutting edges and a plurality of chip discharge flutes and the plurality of chip discharge flutes extend toward a rear end section of the drill without joining, it becomes difficult to increase a size of an axial core of the drill, that is, a thickness of a so-called web.

Particularly, the rear end section of the drill 1 is susceptible to a relatively large force in a direction orthogonal to the rotational axis X during cut processing, resulting in the possibility of a decrease in durability in this rear end section. Nevertheless, the first flute 9 is joined with the second flute 11, thereby making it possible to increase the thickness of the web in the rear end section of the drill 1 that is susceptible to the relatively large force.

On the other hand, when the helix angles of the two chip discharge flutes are made to differ and the chip discharge flutes are directly joined, the direction of flow of the chips that proceed through the chip discharge flutes on the joining side suddenly changes at the joining point of the chip discharge flutes. This results in the possibility of chip flow stagnation at this joining point and clogging by chips.

In the drill 1 of the present embodiment, as illustrated in FIG. 8, an auxiliary flute 19 is provided in addition to the first flute 9 and the second flute 11 to the outer periphery of the drill body 3. The auxiliary flute 19 extends along the second flute 11 on the front side in the rotating direction of the rotational axis X. Then, the first flute 9 does not simply join with the second flute 11, but rather a rear end of the first flute 9 joins with the auxiliary flute 19.

Thus, the auxiliary flute 19 is provided in a location where the first flute 9 joins with the second flute 11, and the rear end of the first flute 9 indirectly joins with the second flute 11 by joining with the auxiliary flute 19. The provision of the auxiliary flute 19 makes it possible to ensure a wide space at the joining point of the first flute 9 and the second flute 11. As a result, when the chips that have flowed through the first flute 9 enter the second flute 11, a sudden change in the direction in which the chips flow is suppressed.

Specifically, the flow rate and outflow direction of the chips that flow through the first flute 9 and enter the second flute 11 can be adjusted in the auxiliary flute 19, thereby suppressing sudden entry of the chips into the second flute 11. This results in a favorable chip flow and a decrease in the possibility of clogging by chips. Because the chips that flowed through the first flute 9 enter the second flute 11, a rear end of the second flute 11 extends further toward the rear end portion of the drill body 3 than the rear end of the first flute 9.

Further, the auxiliary flute 19 is not entirely provided along the second flute 11 from the tip end to the rear end, but is rather partially positioned adjacent to the second flute 11. Thus, this configuration makes it possible to suppress decreases in web thickness caused by the auxiliary flute 19 formed larger than necessary.

The rear end of the second flute 11, as illustrated in FIG. 8, extends further toward the rear end portion of the drill body 3 than a rear end of the auxiliary flute 19. As previously mentioned, the rear end section of the drill 1 is susceptible to a relatively large force during cut processing. Nevertheless, because the rear end of the auxiliary flute 19 is positioned further on the tip end side than the rear end of the second flute 11, it is possible to further increase the web thickness in a cross section orthogonal to the rotational axis X in the rear end section of the cutting portion 15 of the drill body 3.

The web thickness, that is, a diameter of an inscribed circle in the cross section orthogonal to the rotational axis X of the drill body 3, is preferably at least 20% of a diameter of a circumscribed circle. Specifically, for example, when the outer diameter D (diameter of the circumscribed circle) of the drill body 3 is 1 mm, the web thickness is preferably at least 0.2 mm. Further, depths of the first flute 9 and the second flute 11 are thus preferably no more than 40% of the diameter of the circumscribed circle.

The auxiliary flute 19 of the present embodiment, as illustrated in FIG. 8, includes a first region 21 positioned on the tip end portion side of the drill body 3, and a second region 23 positioned further on the rear end portion side of the drill body 3 than this first region 21. The first region 21 increases in depth toward the rear end portion of the drill body 3. The second region 23 decreases in depth toward the rear end portion of the drill body 3. Then, the rear end of the first flute 9 joins with the first region 21 of the auxiliary flute 19. It should be noted that the depth of the auxiliary flute 19 above refers to a value obtained by subtracting a distance between a bottom of the auxiliary flute 19 and the rotational axis X from a radius of the drill body 3 in the cross section orthogonal to the rotational axis X.

When the first flute 9 joins with the first region 21 that has gradually increased in depth, it is possible to gradually increase the amount of chips that flow from the first flute 9 to the auxiliary flute 19. This makes it possible to suppress a sudden inflow of chips from the first flute 9 to the auxiliary flute 19, resulting in smooth chip flow.

It should be noted that, in the above, the first region 21 need not decrease in depth toward the rear end portion of the drill body 3, and therefore may partially include a region having a constant depth in the first region 21.

Further, the second region 23 of the auxiliary flute 19 in the present embodiment is positioned further on the rear end portion side of the drill body 3 than the rear end of the first flute 9, and the auxiliary flute 19 becomes sufficiently deep at a stage in which all chips flow from the first flute 9 to the auxiliary flute 19. As a result, the space through which the chips flow is sufficiently secured, making it possible to suppress excessive collision between the chips that have flowed through the first flute 9 and the chips that have flowed through the second flute 11. As a result, very favorable chip flow is achieved.

It should be noted that, while the auxiliary flute 19 of the present embodiment includes the first region 21 and the second region 23, the present invention is not limited to such a configuration. For example, the auxiliary flute 19 may further include a third region (not illustrated) between the first region 21 and the second region 23, the third region having a constant depth.

The second region 23 of the auxiliary flute 19 of the present embodiment is longer in a direction parallel to the rotational axis X than the first region 21. Specifically, a length of the second region 23 indicated by L2 is longer than a length of the first region 21 indicated by L1. The chips from the first flute 9 in the first region 21 of the auxiliary flute 19 flow to the auxiliary flute 19. Thus, the first region 21 need only have a length that is capable of suppressing a sudden change in the direction of flow of the chips that flowed from the first flute 9.

On the other hand, in the second region 23, the chips that flowed from the first flute 9 flow from the second region 23 to the second flute 11, and therefore collide with the chips that flowed from the second flute 11. As a result, a length in which the second region 23 and the second flute 11 join is preferably maintained longer than a length in which the first region 21 and the second flute 11 join. In the drill 1 of the present embodiment, the second region 23 is longer in the direction parallel to the rotational axis X than the first region 21, making the flow of chips even more favorable.

In the second region 23 of the auxiliary flute 19 of the present embodiment, a length L3 in a direction orthogonal to the rotational axis X in a side view decreases toward the rear end portion of the drill body 3. This makes it possible to keep the chips that flow through the second region 23 from suddenly flowing to the second flute 11, thereby creating a smooth flow of chips from the second region 23 to the second flute 11.

The second flute 11 of the present embodiment decreases in depth toward the rear end portion of the drill body 3 further on the rear end portion side of the drill body 3 than the region in which the second flute 11 joins with the first flute 9 via the auxiliary flute 19. As a result, it is possible to increase the web thickness toward the rear end portion of the drill body 3. Accordingly, the rigidity of the rear end section of the drill 1 susceptible to a relatively large force can be increased.

It should be noted that, in the above, the second region 11 need not increase in depth toward the rear end portion of the drill body 3 further on the rear end portion side of the drill body 3 than the region in which the second flute 11 joins with the first flute 9 via the auxiliary flute 19, and therefore may partially include a region having a constant depth.

The outer periphery of the drill body 3 of the present embodiment includes a first outer peripheral surface 25 positioned along the first flute 9 further on a rear side in the rotating direction of the rotational axis X than the first flute 9, and a so-called body clearance 24 positioned further on the rear side in the rotating direction of the rotational axis X than the first outer peripheral surface 25, and further on a front side in the rotating direction of the rotational axis X than the second flute 11, along the second flute 11. The first outer peripheral surface 25 functions as a so-called margin. The body clearance is spaced inwards so as to come closer to the rotational axis X than the first outer peripheral surface 25, and a portion thereof functions as a first clearance surface 27.

Further, the outer periphery of the drill body 3 includes a second outer peripheral surface 29 positioned along the second flute 11 further on the rear side in the rotating direction of the rotational axis X than the second flute 11, and a body clearance positioned further on the rear side in the rotating direction of the rotational axis X than this second outer peripheral surface 29, and further on the front side in the rotating direction of the rotational axis X than the first flute 9, along the first flute 9. The second outer peripheral surface 29 functions as a margin, similar to the first outer peripheral surface 25. The body clearance is spaced inwards so as to come closer to the rotational axis X than the second outer peripheral surface 29, and a portion thereof functions as a second clearance surface 31.

In the drill 1 of the present embodiment, a distance from the rotational axis X of the body clearance 24 positioned along the second flute 11 is not constant, but rather decreases from a specified point positioned on the tip end side of the joining point of the first flute 9 and the second flute 11 to the rear end portion of the drill body 3. In other words, the body clearance 24 is spaced inwards to a relatively large extent so as to come closer to the rotational axis X than the first outer peripheral surface 25, further on the rear end portion side of the drill body 3 than the specified point described above.

That is, in the drill 1 of the present embodiment, from the specified point positioned further on the tip end side than the joining point of the first flute 9 and the second flute 11 to the tip end of the body clearance 24, is the first clearance surface 27 having a constant distance from the rotational axis X. Additionally, from the above-described specified point positioned further on the rear end portion side of the drill body 3 than the above-described joining point to the tip end of the body clearance 24, is the auxiliary flute 19 having a relatively short distance from the rotational axis X.

As a result, in the drill 1 of the present embodiment, the first clearance surface 27 is positioned further on the tip end portion side of the drill body 3 than the auxiliary flute 19 and is connected with the auxiliary flute 19, and the first flute 9 joins with the second flute 11 via the auxiliary flute 19 rearward from the rear end of the first outer peripheral surface 25.

It should be noted that while a portion of the body clearance 24 serves as the auxiliary flute 19 in the present embodiment, the present invention is not particularly limited thereto. The first flute 9 need only join with the second flute 11 via the auxiliary flute 19, and thus the auxiliary flute 19 may be configured separately from the body clearance 24. Further, the first outer peripheral surface 25 may be configured to extend to the inside of the first region 21 of the auxiliary flute 19.

Further, in the drill 1 of the present embodiment, as illustrated in FIG. 8, the second clearance surface 31 is not formed so as to be substantially entirely adjacent to the second outer peripheral surface 29 from a tip end to a rear end of the second outer peripheral surface 29, but rather is formed only in a region adjacent to a portion on the tip end side of the second outer peripheral surface 29. Specifically, the second clearance surface 31 is formed only from the tip end of the second outer peripheral surface 29 to a region corresponding to a boundary between the first clearance surface 27 and the auxiliary flute 19.

As a result, the boundary between the first clearance surface 27 and the auxiliary flute 19, and a rear end of the second clearance surface 31 are configured so that the distances from the tip end portion of the drill body 3 in the direction along the rotational axis X are the same. Rearward from the second clearance surface 31, the second clearance surface 31 is not formed and the second outer peripheral surface 29 is formed with a wide width.

With a portion of the body clearance 24 established as the auxiliary flute 19, the first flute 9 joins with the second flute 11 via the auxiliary flute 19, making it possible to achieve a favorable chip flow. Nevertheless, with the formation of the auxiliary flute 19, the web thickness decreases. In the drill 1 of the present embodiment, because the second outer peripheral surface 29 is largely formed so as to correspond to a section in which the auxiliary flute 19 is formed, it is possible to increase the web thickness in the section where the auxiliary flute 19 of the drill body 3 is formed as well.

Modified Example

Next, the drill 1 of one modified example will be described in detail using the drawings. FIGS. 15 to 22 are drawings that illustrate the present modified example.

In the drill 1 of the embodiment described above, the first flute 9 is joined with the auxiliary flute 19 by making the helix angle θ1 of the first flute 9 differ from the helix angle θ2 of the second flute 11. Further, the outer periphery of the drill body 3 includes the first outer peripheral surface 25 and the body clearance 24, and this body clearance includes the first clearance surface 27 and the auxiliary flute 19. Nevertheless, the configuration in which the first flute 9 is joined with the second flute 11 is not limited thereto.

Figure 22:
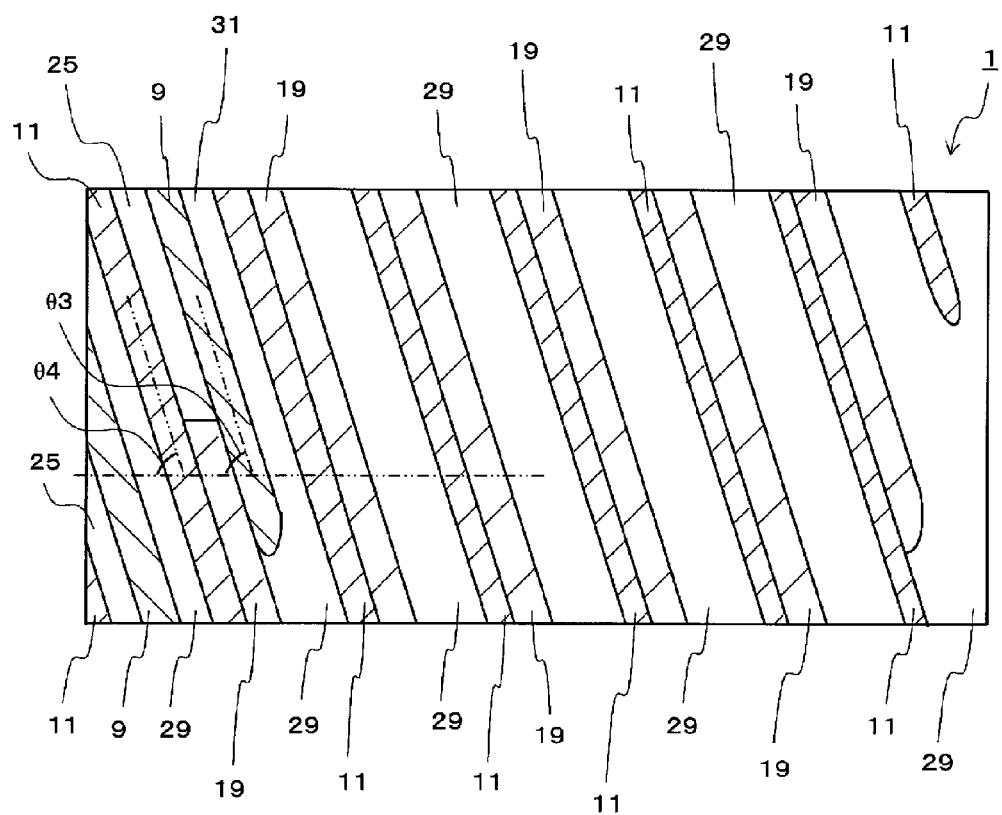
FIG. 22 is a schematic view of the drill illustrated in FIG. 15, with the outer peripheral surface unfolded.

As illustrated in FIG. 22, in the present modified example, a helix angle θ3 of the first flute 9 is the same as a helix angle θ4 of the second flute 11. Further, as illustrated in FIG. 22, the outer periphery of the drill body 3 does not include a body clearance. Furthermore, the first outer peripheral surface 25 of the outer periphery of the drill body 3 includes a region that is positioned on the tip end portion side of the drill body 3 and has a constant distance from the rotational axis X, and a region that is positioned further on the rear end portion side of the drill body 3 than this region and has a relatively short distance from the rotational axis X.

Then, a section of these regions that is positioned on the tip end portion side of the drill body 3 functions as a margin, and a section positioned on the rear end portion side of the drill body 3 functions as the auxiliary flute 19.

Even when the first flute 9, the second flute 11, and the auxiliary flute 19 are provided as in the present modified example, it is possible to join the first flute 9 with the auxiliary flute 19. When the first flute 9, the second flute 11, and the auxiliary flute 19 are provided as in the present modified example, an even smoother flow of chips is created, thereby further decreasing the possibility of clogging by chips. Further, a body clearance is not provided, making it possible to increase a strength of the drill body 3.

It should be noted that, in the present modified example, all locations other than those described above are configured in the same manner as those of the drill 1 of the above-described embodiment. For example, the first cutting edge 5 and the second cutting edge 7 of the drill 1 in the present modified example have the same configurations as those of the first cutting edge 5 and the second cutting edge 7 of the drill 1 of the above-described embodiment.

Method for Manufacturing Cut Product

Next, the method for manufacturing a cut product according to the embodiment of the present invention will be described in detail using the drill 1 according to the aforementioned embodiment as an example. The following describes the method with reference to FIGS. 23 to 25. It should be noted that, in the FIGS. 23 to 25, the section on the rear end side of the gripped portion 13 of the drill 1 is omitted.

The method for manufacturing a cut product according to the present embodiment includes the following steps (1) to (4).

Figure 23:
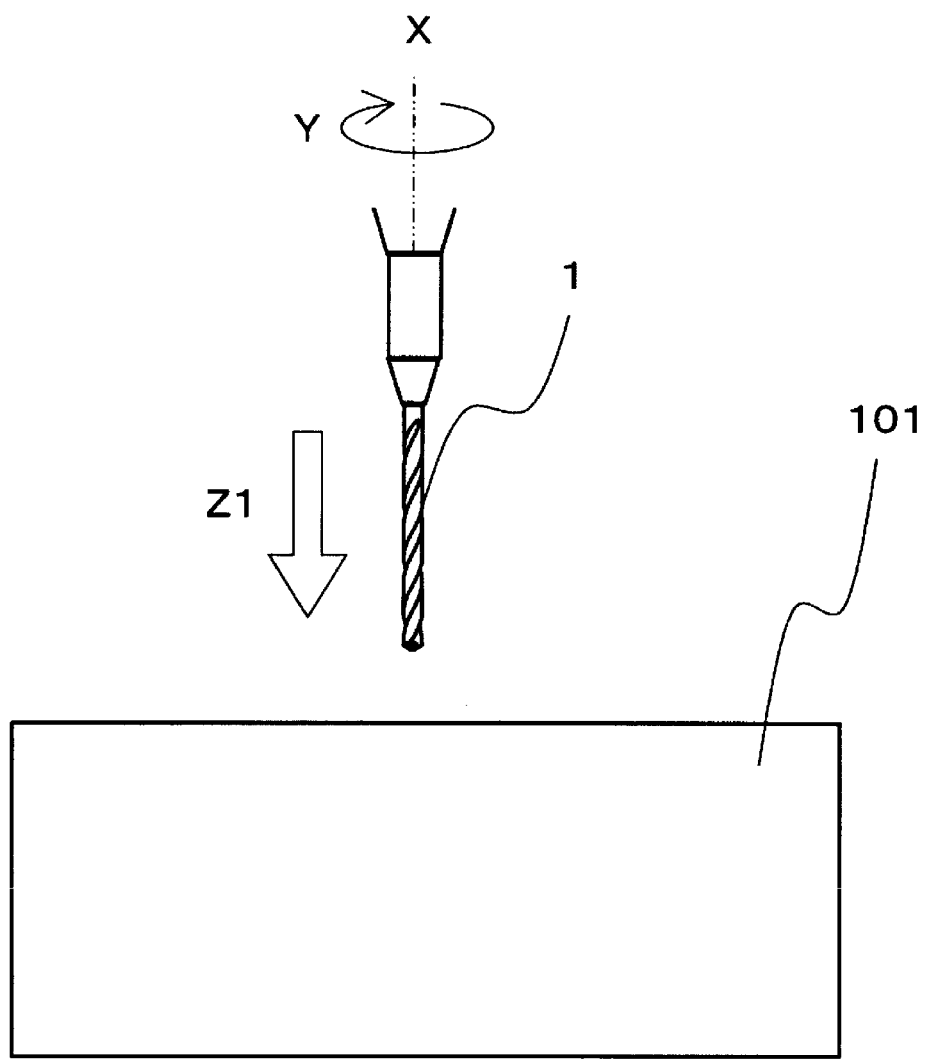
FIG. 23 is a schematic view illustrating one step of a method for manufacturing a cut product of one embodiment of the present invention.

(1) A step of arranging the drill 1 above a prepared work material 101 (refer to FIG. 23).

Figure 24:
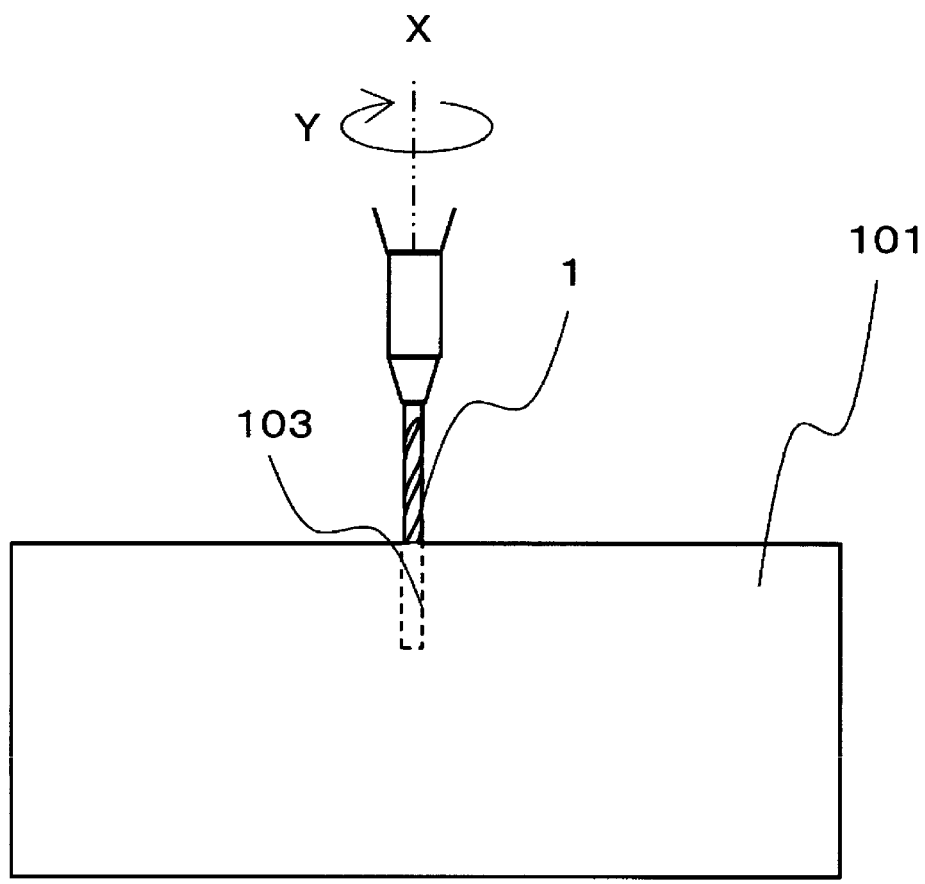
FIG. 24 is a schematic view illustrating one step of a method for manufacturing a cut product of one embodiment of the present invention.

(2) A step of rotating the drill 1 in a direction of the arrow Y about the rotational axis X, and bringing the drill 1 toward the work material 101 in the direction Z1 (refer to FIGS. 23 and 24).

This step, for example, may be performed by fixing the work material 101 on a table of the machine tool having the drill 1 installed thereto, and bringing the drill 1 close to the work material 101 while rotating the drill 1. It should be noted that, in this step, the work material 101 and the drill 1 may be brought relatively close to each other, or the work material 101 may be brought close to the drill 1.

(3) A step of bringing the drill 1 closer to the work material 101, causing the first cutting edge and the second cutting edge of the drill 1 that is rotating to come into contact with a desire position on a surface of the work material 101 and form a machined hole 103 (through-hole) in the work material 101 (refer to FIG. 24).

In this step, from the viewpoint of obtaining a favorable finished surface, the drill 1 is preferably set so that a portion of the region on the rear end side of the cutting portion of the drill 1 does not go all the way through the work material 101. That is, this portion of the region is made to function as a region for chip discharge, thereby making it possible to achieve excellent chip dischargeability via the region.

Figure 25:
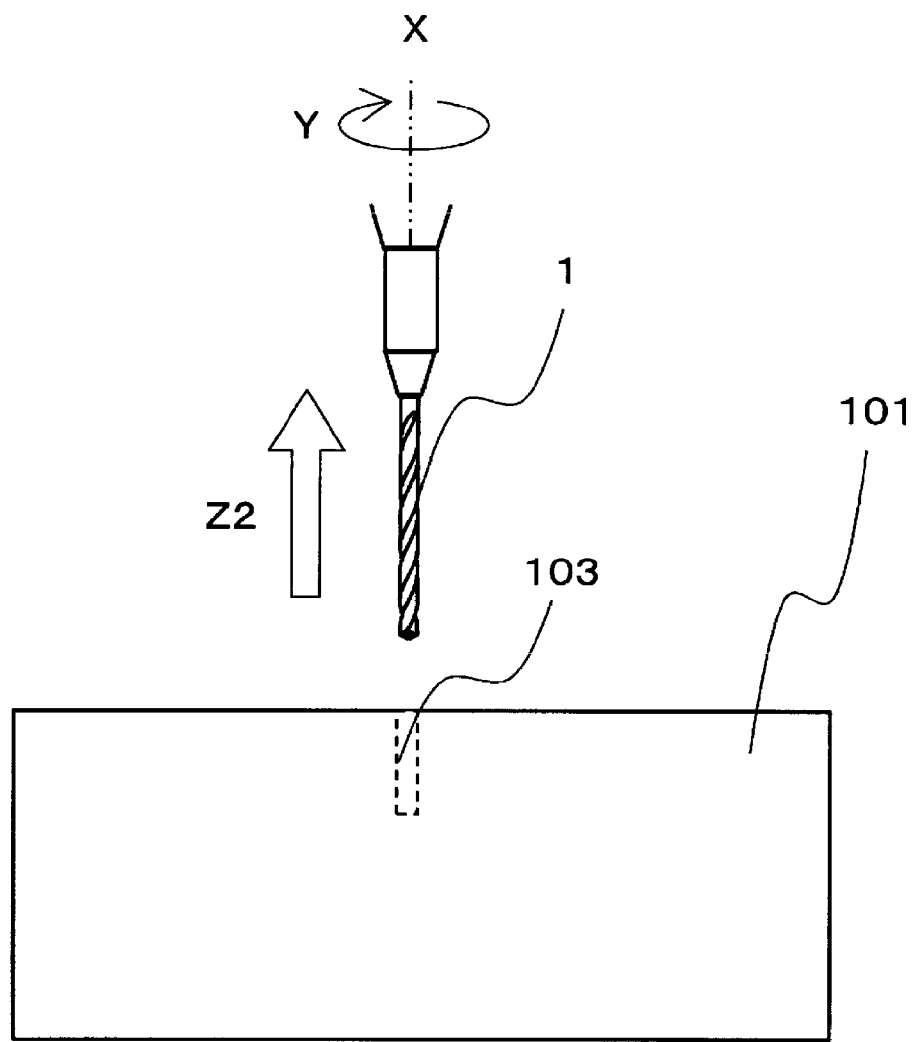
FIG. 25 is a schematic view illustrating one step of the method for manufacturing a cut product of one embodiment of the present invention.

(4) A step of separating the drill 1 from the work material 101 in the direction Z2 (refer to FIG. 25).

In this step as well, similar to the step (2) above, the work material 101 and the drill 1 may be relatively separated from each other, or the work material 101 may be separated from the drill 1, for example.

With the manufacturing method passing through such steps, it is possible to manifest excellent hole workability.

It should be noted that, when cut processing of the work material 101 such as described above is to be performed a plurality of times and a plurality of the machined holes 103 are to be formed in one work material 101, the step of having the first cutting edge and the second cutting edge of the drill 1 come into contact with a different location of the work material 101 need only be repeated while the drill 1 is maintained in a state of rotation.

The embodiments according to the present invention are described above. However, the present invention is not limited to the aforementioned embodiments, and naturally includes various modifications within a scope that does not deviate from the spirit of the present invention.

REFERENCE SIGNS LIST

1 Drill
3 Drill body
5 First cutting edge
7 Second cutting edge
9 First chip discharge flute (first flute)
11 Second chip discharge flute (second flute)
13 Gripped portion
15 Cutting portion
17 Chisel edge
19 Auxiliary flute
21 First region
23 Second region
25 First outer peripheral surface
27 First clearance surface
29 Second outer peripheral surface
31 Second clearance surface
101 Work material
103 Machined hole (through-hole)

The invention claimed is:

1. A drill comprising:
a drill body with a rod shape, having a rotational axis, the drill body comprising:
 a tip end portion;
 a rear end portion; and
 an outer periphery at a surface of the drill body;
a first cutting edge and a second cutting edge positioned on the tip end portion;
a first chip discharge flute that is provided on the outer periphery and spirally extends around the rotational axis from the first cutting edge toward the rear end portion, and comprising a first rear end;
a second chip discharge flute that is provided on the outer periphery of the drill body, and spirally extends around the rotational axis from the second cutting edge toward the rear end portion, and comprising a second rear end extending toward the rear end portion; and
an auxiliary flute that is provided on the outer periphery of the drill body, comprises a third rear end, wherein
the second rear end extends further toward the rear end portion than the first rear end,
the first rear end joins with the auxiliary flute in a joining section, and
the auxiliary flute extends along the second chip discharge flute toward the tip end portion from the joining section and towards the rear end portion from the joining section.

2. The drill according to claim 1, wherein the second rear end of the second chip discharge flute extends further toward the rear end portion of the drill body than a third rear end of the auxiliary flute.

3. The drill according to claim 1, wherein the auxiliary flute comprises;
a first region that is positioned on the tip end portion of the drill body and increases in depth toward the rear end portion of the drill body, and
a second region that is positioned on the rear end portion of the drill body and decreases in depth toward the rear end portion of the drill body; and
the first rear end of the first chip discharge flute joins with the auxiliary flute in the first region.

4. The drill according to claim 3, wherein the second region is longer in a direction parallel to the rotational axis than the first region.

5. The drill according to claim 1, wherein the auxiliary flute is positioned in front of the second chip discharge flute in a direction toward the tip end portion of the drill body.

6. The drill according to claim 1, wherein
the first chip discharge flute further comprises a first helix angle,
the second chip discharge flute further comprises a second helix angle that is different from the first helix angle.

7. The drill according to claim 6, wherein the first helix angle is greater than the second helix angle.

8. A method for manufacturing a cut product, the method comprising the steps of:
rotating the drill according to claim 1 about the rotational axis;
causing the first cutting edge and the second cutting edge of the drill that are rotating, to come into contact with a work material; and
separating the drill from the work material.

9. A drill, comprising:
a drill body having a rod shape with a rotational axis, the drill body comprising:
 a tip end portion;
 a rear end portion; and
 an outer periphery at a surface of the drill body;
a first cutting edge disposed on the tip end portion;
a second cutting edge disposed on the tip end portion;
a first chip discharge flute on the outer periphery, spirally extending around the rotational axis from the first cutting edge toward the rear end portion, the first chip discharge flute comprising:
 a first rear end; and
 a second rear end that extends further toward the rear end portion than the first rear end;

a second chip discharge flute on the outer periphery, spirally extending around the rotational axis from the second cutting edge toward the rear end portion, the second chip discharge flute comprising a second rear end that extends further toward the rear end portion than the first rear end; and an auxiliary flute on the outer periphery, extending along the second chip discharge flute which joins the auxiliary flute at the first rear end, wherein the second chip discharge flute decreases in depth toward the rear end portion of the drill body starting from a section where the first chip discharge flute joins with the auxiliary flute.

10. The drill according to claim 9, wherein the first flute further comprises a first helix angle, the second flute further comprises a second helix angle that is different from the first helix angle.

11. The drill according to claim 10, wherein the first helix angle is greater than the second helix angle.

* * * * *